Patented Feb. 16, 1954

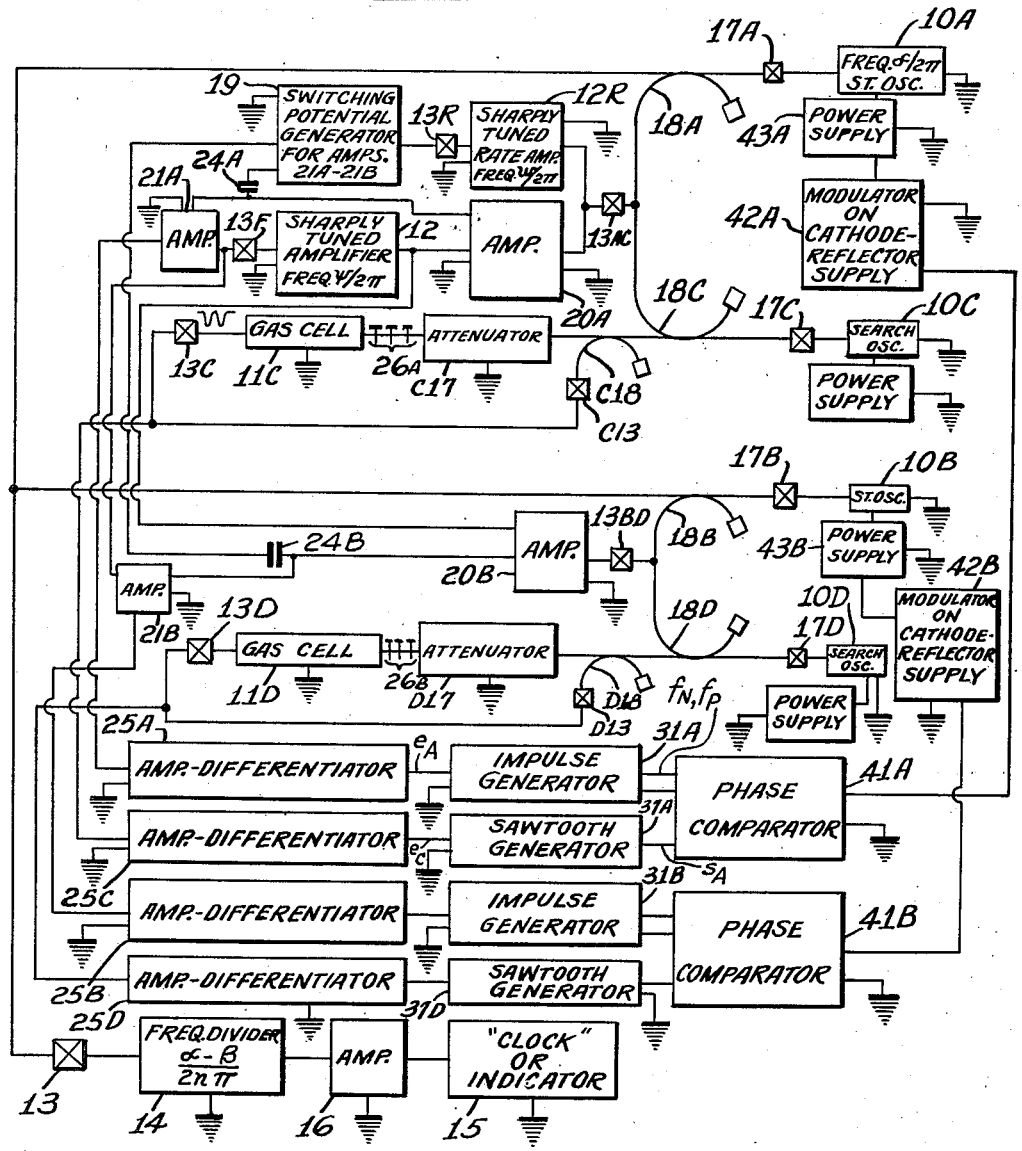

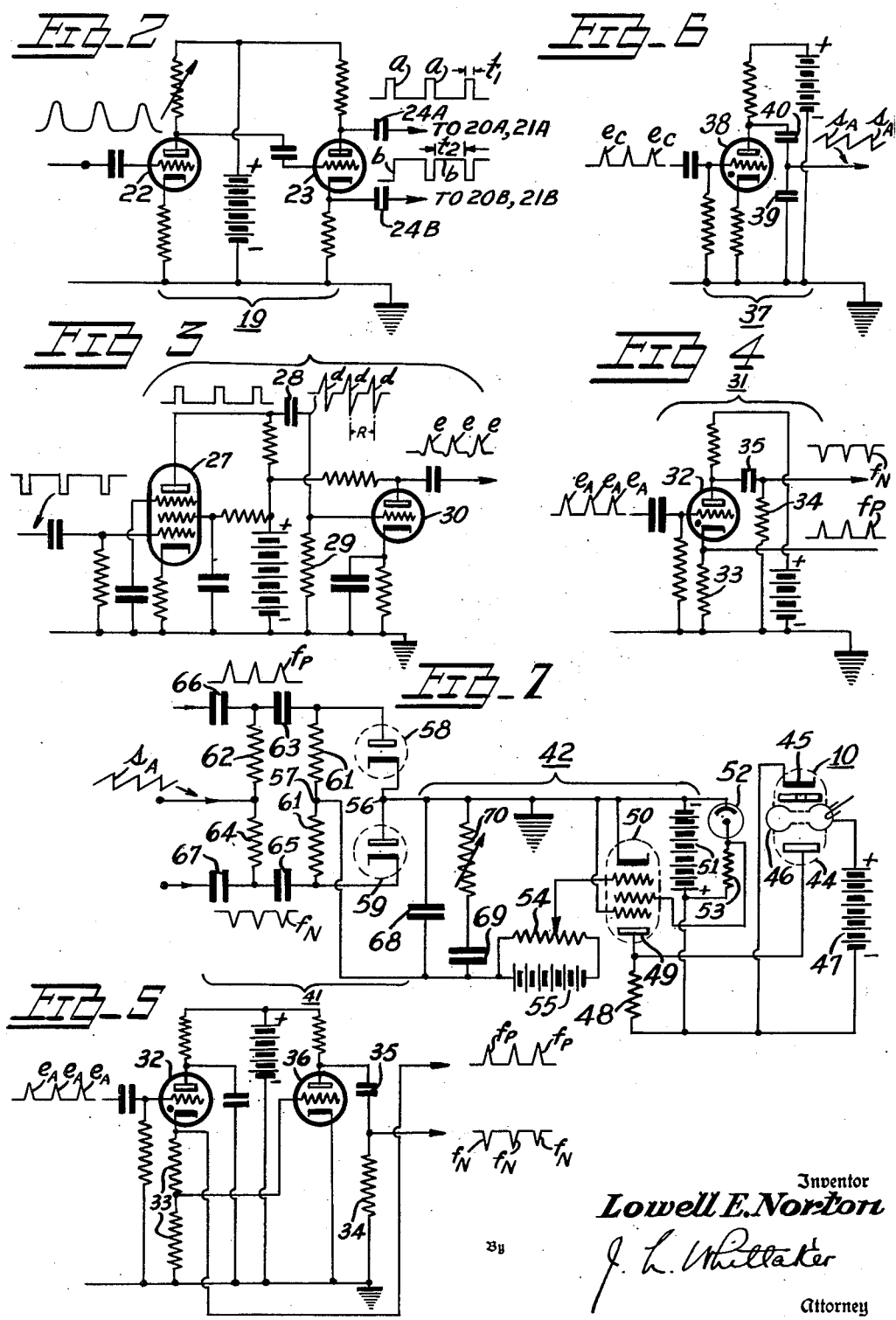

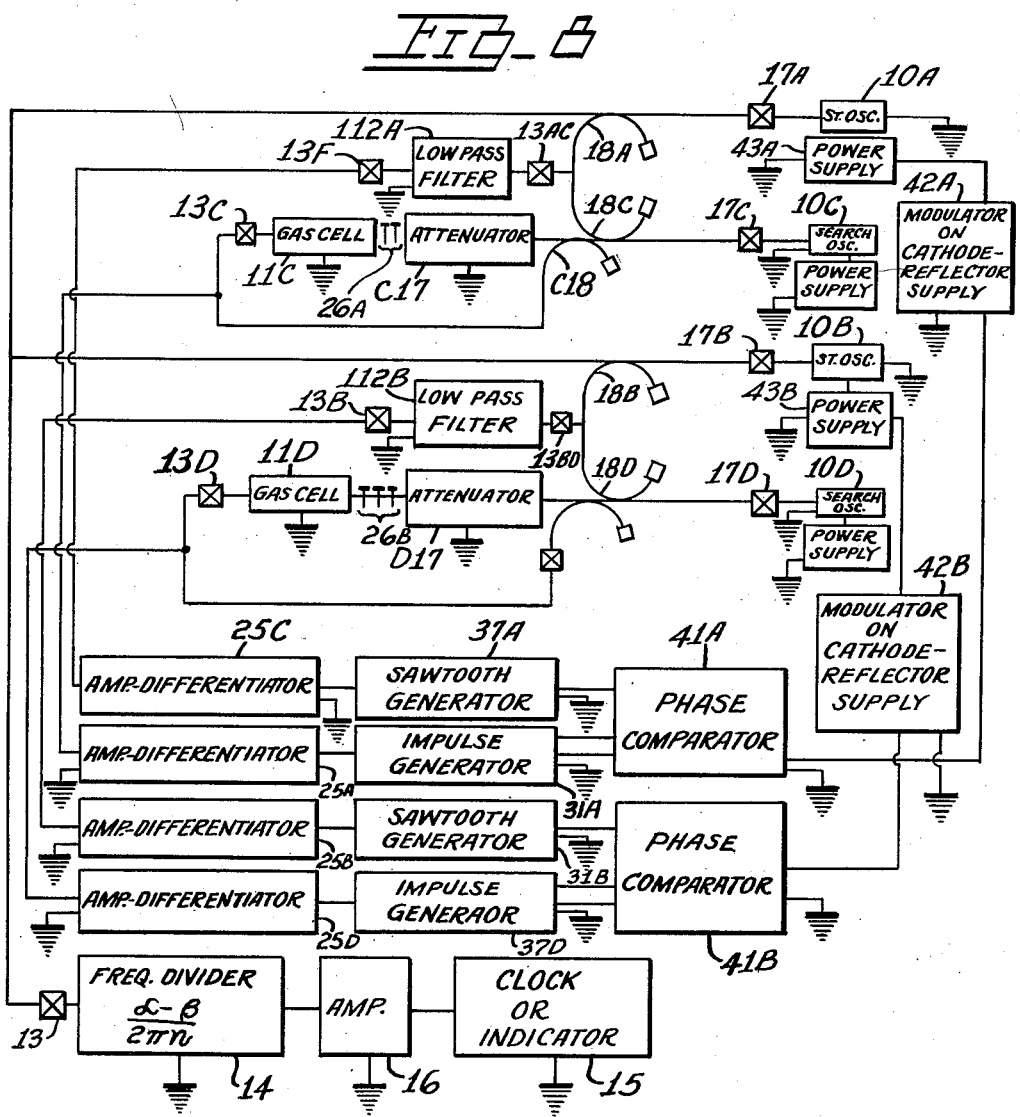

2,669,659

UNITED STATES PATENT OFFICE 2,669,659

STABILIZED GENERATOR

Lowell E. Norton, Princeton Junction, N. J., assignor to Radio Corporation of America, a corporation of Delaware Application February 13, 1948, Serial No. 8,246

6 Claims. (Cl. 250—36)

This invention relates to methods and systems for utilizing selected absorption lines of the same gas or different gases to produce a low frequency standard of high precision unaffected by temperature, pressure and other conditions which impair the accuracy of previously known low frequency standards suited, for example, for driving of electric clocks or similar indicators of time or pressure.

The microwave absorption spectra of certain gases, including ammonia, carbonyl sulphide and methyl halides, comprise spectra "lines" of distinctive and different frequency distribution for the different gases. At very low pressures, these lines or absorption regions may break up into a plurality of sharply defined lines, each corresponding with a precise microwave frequency which is not affected by temperature, pressure, time, and other familiar variables.

Generally in accordance with the present invention, the frequencies of two microwave oscillators are stabilized with respect to a selected pair of aforesaid molecular resonance lines, and the outputs of these oscillators are mixed to produce a difference frequency which is precisely determined by the selected gas-absorption lines, and which is low enough in the frequency spectrum to be divided, if desired, in accordance with known techniques to a still lower frequency suited for operation of a clock or similar indicator designed to operate at low or power line frequencies.

Preferably, and more particularly, each of the stabilized microwave oscillators is regulated by the error-voltage output of a phase comparator which detects any shift in the phase relation between two waves, one of which is produced by impressing upon a gas cell the output of a search oscillator periodically varying over a range including the frequency of the selected line of a molecular resonant gas, and the other of which is produced by the beat frequency between the search oscillator and the stabilized oscillator.

More specifically, the aforesaid waves are differentiated to produce two trains of pulses: the pulses of one train coincide with occurrence of the maxima of the output wave of a frequency selector upon which the aforesaid beat frequency is impressed, and the pulses of the other train are those resulting from differentiation of the output wave of the gas cell. In consequence, the error-voltage produced by the phase-comparator always changes in one sense when the beat frequency maxima advance in phase and always changes in reverse sense when the beat frequency maxima lag in phase.

In one form of the invention, the selector used for discriminating in favor of a predetermined beat frequency, in the entire frequency interval of beat frequencies between the search and stabilized oscillators is sharply tuned, and the one and the same sharply tuned selector is alternately switched into the respective control systems of the two stabilized oscillators thus to eliminate from their aforesaid difference-frequency any remnant error otherwise probable because of the dissimilarity in the effects of temperature and other variables upon the response characteristics of sharply tuned selectors individual to the two control systems.

In another form of the invention, high precision of the different frequency of the oscillators is obtained without the circuit complications necessarily involved in the aforesaid switching of a sharply tuned selector. In this modification, the frequency selectors are low-pass filters which need be only approximately similar because, regardless of the effects of temperature and the like, their outputs are each always symmetrical about the zero beat frequency between the corresponding search and stabilized oscillators.

The invention further resides in methods and systems having features hereinafter described and claimed.

For a more detailed understanding the invention, and for illustration of various systems embodying and utilizing it, reference is made to the accompanying drawings in which:

Figure 1 is a block diagram of a system utilizing stabilized microwave oscillators to produce a low standard-frequency;

Figures 2 to 7 inclusive are schematic diagrams of circuit components of "blocks" of Figure 1; and Figure 8 is a block diagram of a modification of the system of Figure 1.

It is known there are a number of gases including $NH_3$, $COS$, $CH_3OH$, $CH_3NH_2$ and $SO_2$ which exhibit selective absorption of microwave energy. From measurements of the molecular resonance characteristics of such a gas, it is known that the magnitude of the absorption coefficient may be quite independent of the gas pressure, but that the width of the absorption region decreases substantially linearly with decrease of pressure. Specifically, at a wavelength of 1.25 centimeters (24.0 kilomegacycles), the Q of the 3, 3 line of ammonia is approximately 10 at a gas pressure of $\frac{1}{10}$ of an atmosphere; is 100 at $\frac{1}{100}$ of an atmosphere, etc. However, as the pressure is further and further reduced, for example, to the order of tenths of a millimeter of mercury, or substantially less, the absorption region breaks up into a plurality of sharply defined lines, each precisely corresponding with a particular microwave frequency unaffected by usually encountered ambient conditions, such as temperature, pressure and the like and having a Q of the order of 50,000 and higher.

Generally in accordance with the methods used in the practice of the present invention, a selected pair of these sharply defined lines, which may be of the same or of different gases, are utilized in stabilization of two microwave oscillators whose output frequencies are mixed to produce a difference-frequency which may be of the order of tens of megacycles and is precisely related to the difference between two microwave frequencies corresponding with the selected gas absorption lines. The oscillator difference-frequency so produced may be impressed upon a conventional form of frequency divider, such as a multivibrator, suited for operation at frequencies of this lower order to produce an output frequency which may be of the order of cycles per second and so suited for energization of an electric clock or other indicator calibrated in terms of time or frequency. Each of the aforesaid microwave oscillators may be stabilized at a selected molecular resonant frequency of a gas by recourse to any of the methods or systems disclosed in copending applications, Serial No. 786,736, filed November 18, 1947; Serial No. 1,240, filed January 8, 1948; Serial No. 4,497, filed January 27, 1948; Serial No. 5,563, filed January 31, 1948; and Serial No. 5,603, filed January 31, 1948, but for completeness and clarity in the two preferred systems herein specifically shown and described, there are schematically shown preferred stabilizing arrangements which afford a wider range of control without possibility of ambiguous interpretation of the sense of deviation of the stabilized oscillator frequency.

Now referring to Figure 1, the microwave oscillator 10A is stabilized at a frequency $\alpha/2\pi$ which is equal to a selected molecular resonance frequency of gas within cell 11C plus (or minus) the intermediate frequency F to which an amplifier 12 is sharply tuned. A second microwave oscillator 10B is stabilized at a frequency $\beta/2\pi$ which is equal to the molecular resonance of gas within cell 11D plus (or minus) the same intermediate frequency (F). The outputs of the two stabilized microwave oscillators 10A, 10B are impressed upon the mixer 13, which may be and preferably is a crystal rectifier.

The two microwave frequencies $\alpha$ and $\beta$ may be and preferably are so chosen that their difference frequency $$\frac{\alpha - \beta}{2n\pi}$$

appearing in the output of mixer 13, is low enough to be divided by a conventional frequency-divider circuit, generically represented by block 14 to produce an output frequency of the order of cycles per second. By way of example, assuming the gas used in the cells 11C and 11D is ammonia, the 8, 6 line and the 9, 7 line corresponding respectively with 20719.19 megacycles and 20735.47 megacycles may be selected to afford a difference frequency of 16.28 megacycles; the 5, 4 line (22,653 megacycles) and the 4, 3 line (22,683.73 megacycles) may be selected to afford a difference frequency of 30.73 megacycles; or the 2, 2 line (23,722.59 megacycles) and the 1, 1 line (23,694.48 megacycles) may be selected to afford a difference frequency of 24.11 megacycles, and so on for other selected pairs of lines. By using different gases in the two cells, the number of possible pairs for selection is still further increased with corresponding increase in the precise frequency-differences which may be availed of in practice of the invention.

Each of the gas cells 11C, 11D may be a section of waveguide having at each of its opposite ends a window of mica or other suitable dielectric permitting passage of microwave energy and forming a gas-tight enclosure suitable for containing gas at pressures of 0.02 millimeter of mercury or less.

The input or output of frequency divider 14 may itself be used as a precision sub-microwave frequency standard or, when it is desired to operate a precision clock or indicator 15, the output of divider 14 may be amplified by a conventional low-frequency power amplifier 16 to drive the motor of clock 15 which by choice of the gas lines, of the dividing factor $n$ and of the gearing in the indicator may have, for example, a one revolution per second rotation. Preferably, the division ratio $n$ is very large so that the output of the divider 14 is very close to one cycle per second and any further ratio change is effected by selection of the gearing. It is thus insured that any remnant control error in the instantaneous difference between the frequencies $\alpha$ and $\beta$ of the stabilized oscillators 10A and 10B is very small and so affords a time indication of high precision unattainable by any previously known means.

Preferably the method of stabilizing each of the individual microwave oscillators 10A and 10B is generally similar to that disclosed in copending application Serial No. 4,497. However, it is herein provided, and as hereinafter more fully explained, that a frequency-selective element 12 is switched from one control system to the other, during intervals of zero input, so that any errors due to its instability with time, temperature or other variables in effect cancel out in the difference frequency between the two stabilized oscillators 10A, 10B.

In more detailed explanation of the system shown in Figure 1, the output of stabilized oscillator 10A, suitably reduced if desired by attenuator 17A, is impressed through the directional coupler 18A upon the mixer 13AC, preferably a crystal rectifier. (This and other directional couplers of systems herein disclosed may be of the type more fully described in copending application Serial No. 786,736.) The output of a frequency-modulated search oscillator 10C is also impressed upon mixer 13AC through a directional coupler 18C preceded if desirable by an attenuator 17C. The output of the search oscillator 10C is periodically swept over a band of frequencies which may, for example, be 5 or 10 megacycles wide and which includes both the frequency $\alpha/2\pi$, the molecular resonance frequency of gas in cell 11C, and the frequency $\alpha/2\pi$ plus (or minus, but not both) the intermediate frequency $\psi/2\pi$. The sweep frequency or repetition rate R of the search oscillator 10C is low compared to the carrier frequencies of the oscillators 10A and 10B and is substantially different from the intermediate frequency $\psi/2\pi$: the search frequency may, for example, be 60 cycles per second as produced by any suitable electronic or mechanical modulator and the modulating waveform is preferably sawtoothed. For clarity of explanation, it will be assumed that the carrier frequency of oscillator 10C is periodically raised from an initial frequency below the molecular resonant frequency of the gas in cell 11C to a frequency higher than frequency $\alpha/2\pi + \psi/2\pi$ and then abruptly returned to the initial frequency which is higher than frequency $$\frac{\alpha - \psi}{2\pi}$$

The output of mixer 13AC includes, as one of its components, the frequency $\omega/2\pi$ which is selected by amplifier 12R and impressed upon rectifier 13R to provide a series of control pulses for a switching potential generator 19 which controls the pairs of amplifiers 20A, 21A and 20B, 21B so that the pairs are alternately operative. The first pair of amplifiers 20A, 21A is connected in the I. F. channel of the microwave oscillator 10A stabilized at frequency $\alpha/2\pi$ and the second pair of amplifiers 20B, 21B is connected in the same I. F. channel (and used alternately) of the microwave oscillator 10B stabilized at frequency $\beta/2\pi$.

A suitable form of switching potential generator 19, schematically shown in Figure 2, is more fully described in my U. S. Patent 2,422,122. In brief, the sweep-frequency impulses selected by amplifier 12R, Figure 1, which occur in time before the sweep frequency envelopes from amplifier 12, by suitable selection of relative values of frequencies $\omega/2\pi$ and $\psi/2\pi$, are applied to the input circuit of an amplifier tube 22 whose output signal is impressed on the grid circuit of the inverter and push-pull output tube 23 to produce two series of pulses, substantially rectangular pulse signals "a" and "b" of complementary length. The pulses "a" are applied through condenser 24A, Figures 1 and 2, to amplifiers 20A, 21A effectively to unblock them or turn them "on" for intervals of duration $t_1$ during which the amplifiers 20B and 21B are "off": the pulses "b" are similarly applied through condenser 24B, Figures 1 and 2, to amplifiers 20B and 21B effectively to turn them "on" for intervals of duration $t_2$ during which the amplifiers 20A and 21A are "off."

During each time interval $t_1$ for which it is "on," the amplifier 21A transmits from rectifier 13F to an amplifier-differentiator represented by block 25A in Figure 1, a wave or pulse having maximum amplitude at the instant the difference frequency between oscillator 10A and the FM or search oscillator 10C corresponds with frequency $\psi/2\pi$ to which amplifier 12 is sharply tuned. The output of amplifier 21a is a potential proportional to the envelope of amplifier 12 at repetition ferquency R: otherwise expressed the output of the amplifier 12 during intervals $t_1$ is a waveform whose instantaneous amplitude is a function of the beat frequency between oscillators 10A and 10C. The shape of the output pulses of the differentiator is later discussed.

There is thus provided a series of pulses whose time relation with respect to a second series of pulses, produced as now described, is utilized to stabilize the frequency of microwave generator 10A.

Upon a second amplifier-differentiator represented by block 25C in Figure 1, is impressed a series of pulses or waves each occurring as the carrier frequency of the FM oscillator 10C passes through the molecular resonant frequency of gas in cell 11C. More specifically, output energy from oscillator 10C is transmitted as by a wave guide to gas cell 11C through a path which may include an attenuator C17, and a matching transformer 26A, both of types suitable for operation at microwave frequencies. The microwave energy selectively passed by the gas cell is rectified by crystal 13C producing pulses or waves having the same repetition rate as the modulation-frequency R of oscillator 10C. For cancellation of amplitude-modulation effects and of other variables, output energy from oscillator 10C is transmitted by directional coupler C18 to a second crystal rectifier C13, or equivalent, reversely poled with respect to rectifier 13C. The differential-output of the rectifiers 13C and C13 is impressed upon the differentiator-amplifier 25C.

A suitable type of differentiation-amplifier circuit 25 for each of the differentiator-amplifiers 25A and 25C (as well as for differentiator-amplifiers 25B, 25D later discussed) is shown in Figure 3. The potentials proportional to the resonance curves or characteristics are impressed upon the input circuit of tube 27 are amplified, reversed in polarity and impressed upon the differentiator network comprising condenser 28 and resistor 29 to apply to the grid of tube 30 a double-pulse $d$ for each input pulse. Each pulse $d$ has a negative and a positive peak and is very steep between these peaks. The resulting output of tube 30 is a series of sharp pulses $e$ having a steep rise at the center of the corresponding original input pulse to tube 27.

The time constant of the resistor-capacitor combination 28, 29 is small compared to the repetition period R so that the input pulse to tube 30 is differentiated. The grid-cathode bias of tube 30 is such that with an anode resistance of high value the anode is only slightly above cathode potential. Consequently, the first positive swing of the grid-cathode potential of tube 30 produces little change in anode potential whereas the one immediately following a steep negative swing causes a steep positive swing in anode potential. This steep positive rise may be used to trigger a subsequent gas triode, later herein mentioned, so that the output pulses of the triode occur at the center or peak of the intermediate frequency envelope from beat-frequency selector 12 or of the absorption envelope of cell 11C depending upon the control channel under consideration.

The output pulses $e_A$, Figure 1, of amplifier-differentiator 25A are applied to a push-pull-impulse generator 31A to produce two trains of pulses of the same repetition frequency as pulses $e_A$ so that for each input pulse $e_A$, there is produced a pair of sharp output pulses, $f_N$, $f_P$, concurrent in time and of opposite polarity. Two suitable types of push-pull-impulse generator are shown in Figures 4 and 5. In the type shown in Figure 4, using a gas triode 32 to whose grid the input pulses are applied, the positive output pulses $f_P$ appear across the cathode resistor 33 and the negative output pulses $f_N$ appear across resistor 34 connected to the anode of the tube by condenser 35 and to the cathode of the tube by resistor 33. Alternatively, the impulse-generator may be of the two-tube type shown in Figure 5 in which the total output voltage of tube 32 appears across the cathode resistor 33 to afford positive output pulses $f_P$ which are twice the amplitude obtainable with the circuit of Figure 4, other conditions being the same. The cathode resistor 33 of Figure 5 is tapped and part of the pulse output voltage applied to the grid of a second tube 36 to produce the negative pulse $f_N$ across resistor 34 in series with condenser 35 in the output circuit thereof. The circuit constants are so chosen that these pulses are equal in amplitude to the negative pulses $f_N$ and occur concurrently therewith so that as in Figure 4, each input pulse produces a pair of sharp output pulses of opposite polarity and coincident in time.

The output pulses $e_C$, Figure 1, of amplifier-differentiator 25C are applied to a sawtooth wave generator 37A so that for each input pulse $e_C$ thereof there is a sawtooth output pulse $s_A$ having an abrupt rise and a linear decay. A suitable type of sawtooth generator is shown in Figure 6. The sharp input pulses $e_C$ are applied to the grid of tube 38 to produce across capacitor 39, which is in series with capacitor 40 between the anode and grid of the tube, a series of sawtooth pulse $s_A$ of the repetition rate R.

Reverting to Figure 1, the sharp pulses $f_N$ and $f_P$ from the double impulse generator 31A and the sawtooth pulses $s_A$ from the sawtooth generator 37A are applied to a phase-detector or phase-comparator 41A for producing as later herein more fully described, changes in a D. C. "error" voltage whose sense and magnitude depend upon the sense and extent of deviation of the frequency A of oscillator 10A from its desired value. From the foregoing, it shall be understood that the time of initiation of each sawtooth pulse $s_A$ is rigidly related to the instant that the carrier frequency of FM oscillator 10C in each cycle of its modulating frequency R passes through the frequency of molecular resonance of gas cell 11C. It shall further be understood that time relation between initiation of each pulse $s_A$ and the corresponding pair of pulses $f_N$, $f_P$ depends upon the instantaneous frequency A of stabilized oscillator 10A because if its frequency $\alpha/2\pi$ is above normal the difference frequency $\psi/2\pi$, to which amplifier 12 is sharply selective, is attained earlier in the cycle of the modulating frequency R whereas if the frequency $\alpha/2\pi$ is below normal, the difference frequency $\psi/2\pi$ is attained later in the cycle. The "error" voltage produced by the phase-discriminator or comparator 41A is used to control a regulator 42A for a source 43 of supply voltage for oscillator tube 10A and so correct for deviation of its frequency $\alpha/2\pi$ from the desired value.

The phase-discriminator 41 and modulator 42 of Figure 7 are of type suitable for stabilizing the frequency of a reflex klystron 10, generically exemplary of each of stabilized oscillators 10A and 10B of Figure 1, by regulation of the D. C. voltage of the reflector anode 44. A fixed D. C. voltage difference between the cathode 45 and cavity 46 of the klystron is maintained by a stable or stabilized supply generically represented by battery 47. The voltage-difference between the reflector 44 and cathode 45 of the klystron depends upon the I. R. drop across resistor 48 connected between the anode 49 of the modulator tube 50 and the positive terminal of a source of stabilized D. C. voltage generically represented by battery 51; the gas discharge tube 52 and current-limiting resistor 53 provide additional constancy of the cathode-screen potential of tube 50. The magnitude of the current through resistor 48 and therefore the reflector voltage depends upon the biasing voltage applied to the grid of modulator tube 50: one component of this biasing voltage is of fixed value selected, for example, by adjustment of the potentiometer 54 supplied from battery 55 or other stable source. The other component of this biasing voltage is the "error" output voltage of the phase-detector 41 as appearing between terminals 56, 57 thereof.

In the particular form of phase-comparator 41 shown in Figure 7, the positive and negative pulses $f_P$ and $f_N$ from the preceding associated differentiator-amplifier are respectively applied to the anode of diode 58, or equivalent, and the cathode of a similar rectifier 59. The electrodes of the rectifiers are connected by resistors 61, 61 whose common terminal 57 is one of the output terminals of the comparator; the other electrodes of these rectifiers are connected to the other output terminal 56 of the comparator. The pulses $s$ from the preceding associated sawtooth generator are applied to the anode of rectifier 58 through resistor 62 and condenser 63 and to the cathode of rectifier 59 through resistor 64 and condenser 65. Thus, the average difference value of the current of sawtooth wave form which traverse the resistors 61, 62 in each cycle of the repetition frequency R depends upon the phase relation of the sharp pulses $f_P$, $f_N$ to the sawtooth pulse $s$ and thus the grid-voltage of regulator tube 50 is corrected, if necessary, in each cycle of the modulating frequency R of the search oscillator to adjust the controlled or stabilized oscillator 10 in sense to return its frequency to the desired value.

By way of example, the following circuit constants are given as suitable for the phase-discriminator circuit 41:

Capacitors:
 63, 65 _____mfd__ .05
 66, 67 _____mfd__ .01
 68 _____mfd__ .01–.25
 69 _____mfd__ 10

Resistors:
 61 _____megohms__ 1.8
 62, 64 _____ohms__ 1,000
 70 _____ohms max__ 10,000

As thus far specifically described, the system provides for rigid control of the frequency of oscillator 10A by an "error" voltage derived by comparison of the phase relation of pulses produced during the time intervals $t_1$ for which the amplifiers 20A and 21A are "on." During the intervening time intervals $t_2$ for which the amplifiers 21A and 21B are "on," a generally similar arrangement, including the FM search oscillator 10D, gas cell 11D, intermediate frequency amplifier 12, rectifier 13F, differentiator amplifiers 25B, 25D, impulse generator 31B, sawtooth generator 37D, phase comparator 41B, regulator 42B and variable power supply 43B is effective to stabilize the oscillator 10B for operation at a frequency $\beta/2\pi$ differing from the frequency of molecular resonance in gas cell 11D by the intermediate frequency F.

It is to be noted that the same intermediate frequency amplifier channel 12, 13F is alternately used in control of oscillator 10A during intervals $t_1$, and in control of oscillator 10B during intervals $t_2$. Consequently, any effects of temperature or supply voltage, for example, upon the response characteristics of the intermediate frequency system cancel out so that in effect the difference-frequency of the stabilized oscillators is precisely related to the selected sharp molecular resonance frequencies, which are not affected by temperature, of the bodies of gas in cells 11C and 11D. The exact frequency of the input to amplifier 12 at which switching occurs is not critical so long as the switching pulse at crystal 13R occurs in the cycle of modulating frequency R before the crystal 13F receives a pulse either from amplifier 20A or from amplifier 20B.

The modification shown in Figure 8 is in many respects similar to that of Figure 1 and consequently those elements of the two arrangements having corresponding functions are identified by the same reference characters. For brevity, only those elements or features differing from Figure 1 are specifically discussed.

With the simpler arrangement shown in Figure 8, there is avoided the circuit complications involved in switching of the sharply tuned I. F. amplifier 12, Figure 1, from one control channel to the other. Instead of a sharply-tuned amplifier 12 switched from one control channel to the other, there are used, in the system of Figure 8, two low pass filters 112A, 112B individual to the two control channels. These two filters need be only approximately similar and may, for example, be suited to pass a band of frequencies from 0 to 100 kilocycles.

The reasons it is not necessary in such system to use a common, switched filter in order to obtain precision will appear from the following discussion. As the intermediate frequency output of rectifier 13AC (or 13BD) approaches and passes through zero-beat, the amplitude response of the associated low-pass filter 112A (or 112B) varies symmetrically about the carrier frequency of FM oscillator 19C which corresponds with zero-beat. The associated amplifier-differentiator 25A (or 25B) therefore produces an output pulse which occurs at the center or zero-beat point of its input pulse regardless of any effect of temperature, for example, upon the band-width of the filter. In other respects, the operation of the systems of Figure 1 is similar to that of Figure 8 and it therefore appears unnecessary to repeat the description thereof.

It shall be understood the invention is not limited to the specific methods and systems illustrated and described and that changes and modifications may be made within the scope of the appended claims.

What is claimed is:

1. A system for producing a sub-microwave frequency of high precision which comprises two microwave oscillators, separate gas cells for stabilizing to substantially the same degree the frequency of each of said oscillators, said gas cells each exhibiting molecular resonance at respectively different frequencies whose difference corresponds with said sub-microwave frequency, and means for mixing the outputs of said stabilized oscillators to produce oscillations of said sub-microwave frequency.

2. A system in accordance with claim 1 in which the stabilizing means for each oscillator includes a search oscillator whose frequency is varied over a range including the frequency of the stabilized oscillator and the frequency of one of said gas cells.

3. A system according to claim 2 including means for deriving beat frequency signals from said search oscillator and one of said stabilized oscillators, a frequency selector providing an output which varies in amplitude with said beat frequency, and a phase comparator for detecting shifts in the phase relation between output signals from said frequency selector and one of said gas cells.

4. A system in accordance with claim 1 in which the mixer output is in turn impressed on a frequency-divider for production of a frequency of the order of cycles per second.

5. A system in accordance with claim 3 in which is included a sharply-tuned beat-frequency filter and an electronic switch for alternately including said filter in first one and then the other of said stabilizing means.

6. A system in accordance with claim 2 in which the stabilizing means includes a low-pass filter producing an output symmetrical about zero-beat of the search and stabilized oscillator frequencies.

LOWELL E. NORTON.

References Cited in the file of this patent

UNITED STATES PATENTS

| Number | Name | Date |
|---|---|---|
| 2,398,694 | Case | Apr. 16, 1946 |
| 2,457,673 | Hershberger | Dec. 28, 1948 |
| 2,609,654 | Hershberger | Sept. 9, 1952 |